United States Patent [19]

Huliba et al.

[11] Patent Number: 4,811,035

[45] Date of Patent: Mar. 7, 1989

[54] MODULAR TWO-COLOR FLUID SYSTEM FOR CONTINUOUS INK JET PRINTER

[75] Inventors: David A. Huliba, Centerville; James W. Beard, Bellbrook; John M. Brandon, Dayton, all of Ohio

[73] Assignee: Eastman Kodak Company, Rochester, N.Y.

[21] Appl. No.: 168,093

[22] Filed: Mar. 14, 1988

[51] Int. Cl.[4] ............................................ G01D 15/18

[52] U.S. Cl. .................................. 346/75; 346/140 R

[58] Field of Search .............................. 346/75, 140 R

[56] References Cited

U.S. PATENT DOCUMENTS 4,369,450 1/1983 Iwagami et al. ...................... 346/75

4,617,574 10/1986 Miller et al. .......................... 346/75

*Primary Examiner*—E. A. Goldberg

*Assistant Examiner*—Gerald E. Preston

*Attorney, Agent, or Firm*—John D. Husser

[57] ABSTRACT

A modular ink circulation system for effecting ink flow, in a continuous ink jet printer, from the ink reservoir to the print head and from the print head back to the reservoir. The system comprises, e.g.: (i) an ink supply module including pump, heater and filter that are removable from the printer as a unit; (ii) an ink return module including a pressure transducer, an ink defoaming reservoir and an ink flow-control solenoid that are removable from the printer as a unit; and (iii) a vacuum module including an air pump, an air pressure regulator and an ink collector reservoir that are removable from the printer as a unit.

3 Claims, 4 Drawing Sheets

MODULAR TWO-COLOR FLUID SYSTEM FOR CONTINUOUS INK JET PRINTER

FIELD OF THE INVENTION

The present invention relates to continuous ink jet printers and, more particularly, to improved constructions for the ink and air handling components of multicolor printers of this type.

BACKGROUND ART

In continuous ink jet printer systems ink is supplied under pressure to the orifice cavity of a resonator body and ejects as continuous streams from an orifice plate aimed toward a print zone. The resonator body is vibrated to cause the ink streams to break up into uniformly sized and shaped droplets. A charge plate subsystem is located proximate the stream break-up point and droplets are selectively charged if intended to be non-printing ones. The charged, non-printing drops are deflected to a catcher subassembly which routes them back to the main ink supply. Uncharged drops pass on to the print zone.

U.S. Pat. No. 4,591,870 describes the structural and functional details of the printing and home station subsystems of a continuous ink jet printer of the kind wherein print heads traverse to and from the home station and along an operative print path. U.S. Pat. No. 4,591,875 discloses a fluid handling system for such ink jet printers in which ink reservoirs are constructed as readily replaceable cartridges that are constructed to cooperate with fluid conduits of the printer in an easily connectible and disconnectible fashion.

While the printer described in the above-noted patents can be used in printing with two or more different color inks, the fluid systems envisioned are completely duplicative, each different color fluid system having all the components of the others. This approach works competently; however, the redundancy of components presents a fruitful area for ingenious cost-saving by joint usage of some components. Also that fluid system described in those patents presents challenges for improved compactness to the designer.

In another aspect, it would be desirable to improve the serviceability of the printer disclosed in the above patents. Thus, even though a service call may be required for repair or replacement of more complex parts of the fluid system, it is still desirable that the components be readily accessible and quickly replaceable, in a manner that minimizes printer downtime and avoids mess about the printer site.

SUMMARY OF THE INVENTION

One important object of the present invention is to provide, for such continuous ink jet printers, improved modular subsystem constructions which enhance their serviceability. Another object of the invention is to reduce the costs and size of such printers, e.g., by designs which share certain components between different color subsystems.

In one aspect, the present invention constitutes in continuous ink jet printer apparatus having an ink supply reservoir and a print head for selectively directing print droplets to a print zone, an improved ink circulation system for supplying ink flow from the reservoir to the print head and returning unused ink from the print head to the reservoir, the system comprising:

(a) an ink supply module including pump, heater and filter means removable from the printer as a unit;

(b) an ink return module comprising pressure transducer, ink defoaming and ink flow-control solenoid means removable from the printer as a unit; and (c) a vacuum module including pump, pressure regulator and ink collector reservoir means removable from the printer as a unit.

BRIEF DESCRIPTION OF THE DRAWINGS

The subsequent description of preferred embodiments refers to the attached drawings wherein.

DETAILED DESCRIPTION OF THE PREFERRED EMBODIMENTS

Figure 1:
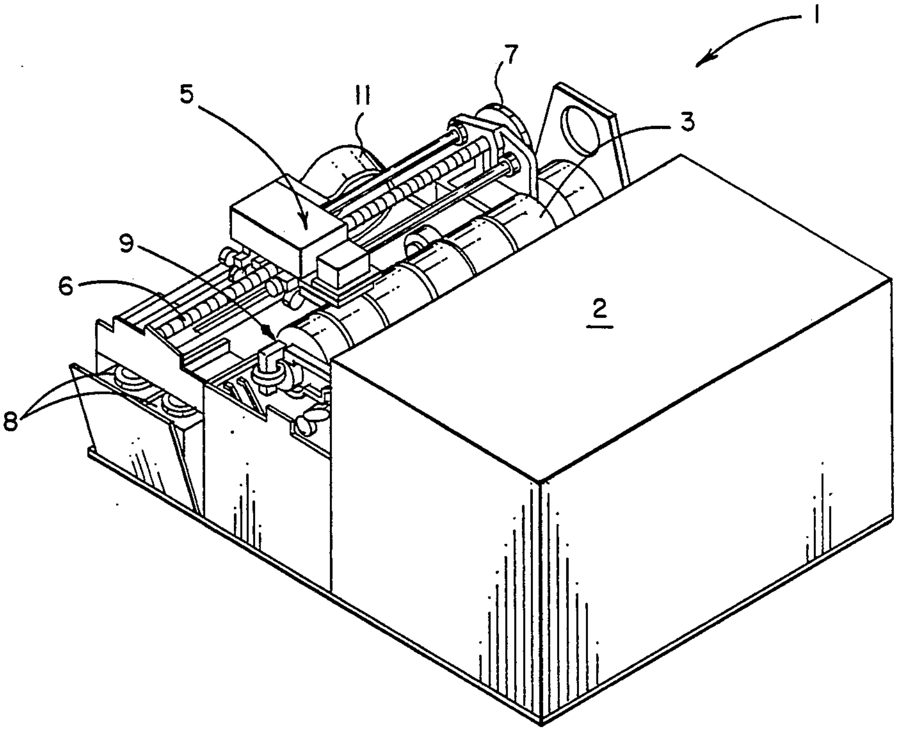
FIG. 1 is a perspective view of one printer embodiment in which the present invention is useful.

FIG. 1 illustrates an exemplary ink jet printing apparatus 1 employing one embodiment of the present invention. In general, the apparatus 1 comprises a paper feed and return sector 2 from which sheets are transported into and out of operative relation on printing cylinder 3. The detail structure of the sheet handling components does not constitute an essential part of the present invention and need not be described further.

Also illustrated generally in FIG. 1 is a print head assembly 5 which is mounted for movement on carriage assembly 6 by appropriate drive means 7. During printing operation the print head assembly is traversed across a print path in closely spaced relation to a print sheet which is rotating on cylinder 3. Ink is supplied to and returned from the print head assembly by means of flexible conduits 11 which are coupled to an ink cartridge(s) 8. A storage and start-up station 9 is constructed adjacent the left side (as viewed in FIG. 1) of the operative printing path of print head assembly 5; and the drive means 7 and carriage assembly 6 are constructed to transport particular portions of the print head assembly into operative relations with station 9 at appropriate sequences of the operative cycle of apparatus 1.

In a preferred embodiment, the printer 1 has a print head assembly module 12 (See FIG. 2) which can be easily inserted into operative relation in a nest 13 that traverses the print zone of the printer. The detail constructions of the print head assembly module 12 and nest 13 are described in U.S. application Ser. No. 07/168,094, entitled "Continuous Ink Jet Printer Having Modular Print Head Assembly" and filed Mar. 14, 1988 in the names of Bowling et al, which is incorporated herein by reference. In general, the print head includes an upper portion comprising a resonator body having piezoelectric transducer strips mounted thereon. Ink inlet and outlet tubes extend to and from openings in the sides of the body and the openings lead to an ink cavity that communicates with the orifice plate. The orifice plate is coupled to the body to direct ink droplet streams downwardly toward the print cylinder 3. The detail construction of the resonator body and transducer can be as described in U.S. Pat. No. 4,646,104 and the orifice plate can be constructed as described in U.S. Pat. No. 4,184,925.

The printhead assembly module 12 also includes a lower print head portion that includes a charge plate assembly and a droplet catcher. The detail construction of the charge plate can be as described in U.S. Pat. No. 4,560,991 and droplet catcher details can be as described, e.g. in U.S. Pat. Nos. 3,813,675; 4,035,811 or 4,268,836. Preferred techniques for interconnection of the charge plate on the catcher is described in U.S. Pat. No. 4,622,562. An air guide assembly is constructed to interfit in opposing relation to the operative charge plate and catcher surfaces. Preferred constructions and function of the air guide are described in U.S. Pat. No. 4,591,869 which also explains how air induced through a filter provides a positive flow of air, downwardly through the space between the catcher and air guide, to protect the orifice plate, charge plate and upper catcher regions from paper dust.

The module 12 has check valve couplings for cooperating with ink supply and return ports 15, 16 of nest 13 and has a catcher coupling which is adapted to interfit in sealing relation with the catcher return line port 17. An electrical plate 20 of the printhead assembly module 12 cooperates with terminals of nest 13 when the module is moved into operative relation in the nest. A cover member 18 is constructed to snap fit over the assembly just described.

Figures 2, 4:
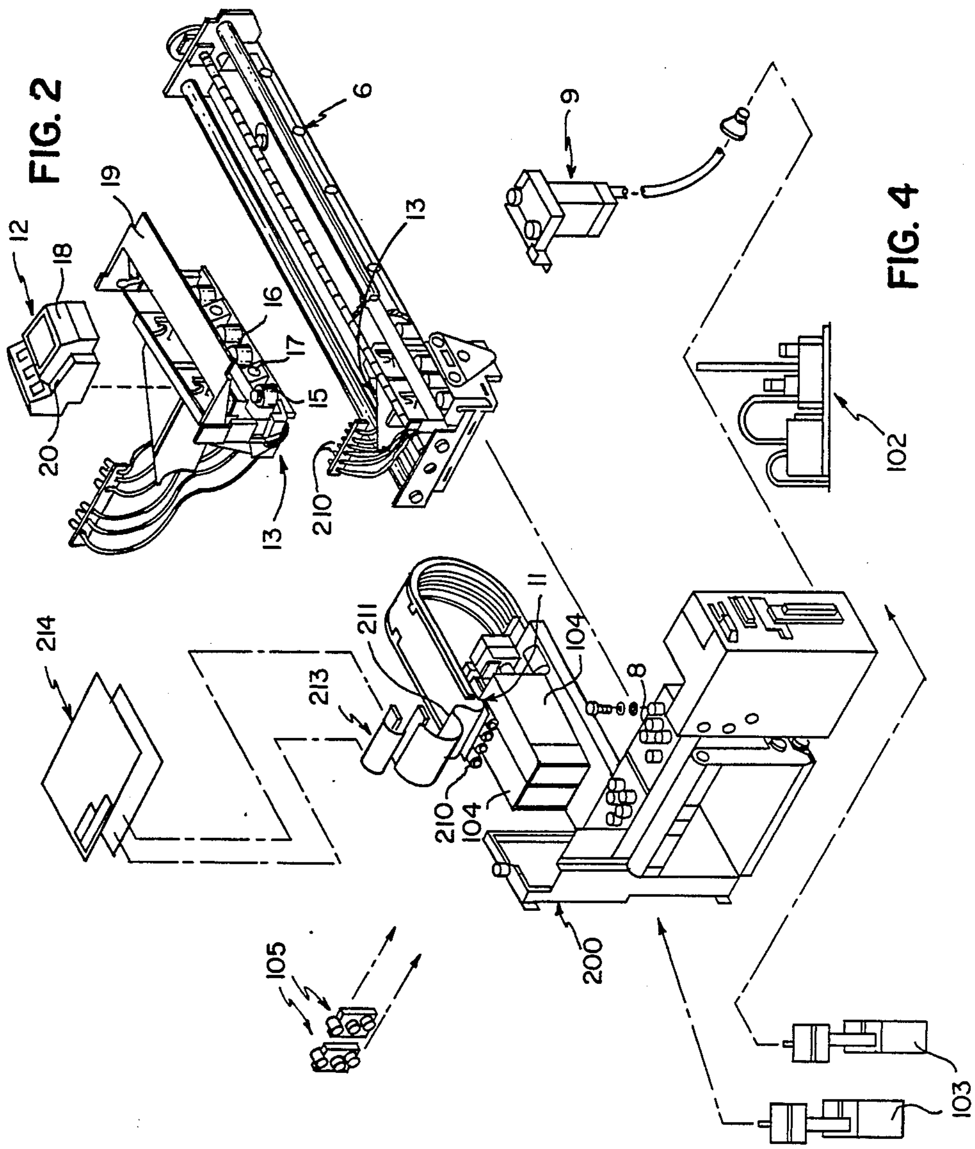
FIG. 2 is an enlarged perspective view of a print head cartridge and nest construction for use in one preferred embodiment of the present invention.
FIG. 4 is an exploded perspective view of modular assemblies in accord with one embodiment of the present invention.

The nest assembly 13 is constructed to receive, support and index two of the modules 12 in operative fluid and electrical cooperation in the printer 1. A nest camlatch assembly 19 is constructed to move from a rear (unlatched) position to a forward (latched) position as shown in FIG. 2. A manifold plate is constructed to attach to the bottom of the base of nest 13 and includes ports for respectively coupling port portions 15, 16, 17 to the supply return and catcher return lines of the printer.

Figure 3:
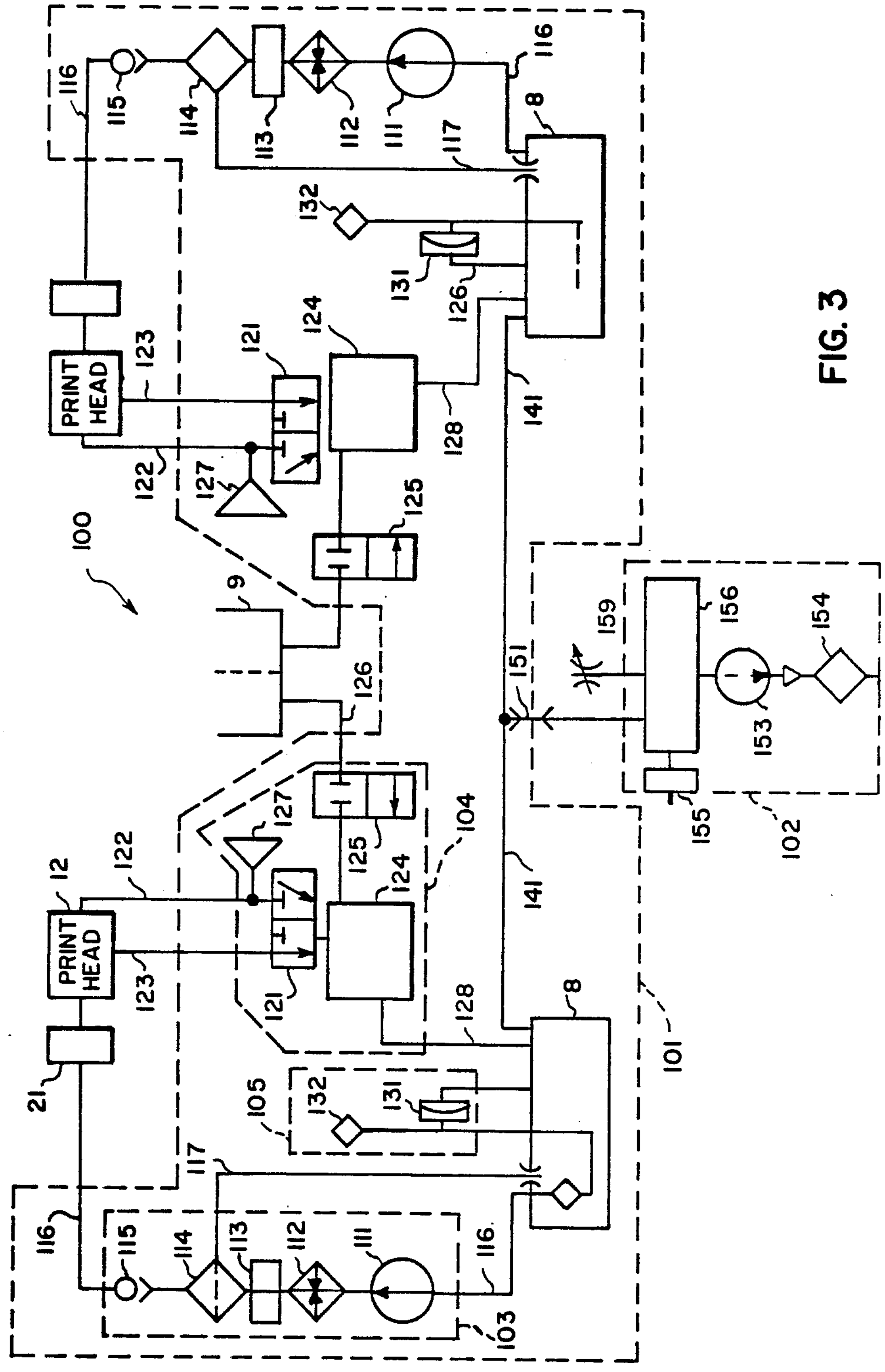
FIG. 3 is a schematic illustration of one preferred embodiment of two-color fluid system in accord with the present invention.

FIG. 3 illustrates schematically a two-color fluid system 100 for use, according to the present invention, with the printer described above. As indicated by the broken lines in FIG. 3, the two-color fluid system comprises a main fluid module 101 and vacuum module 102. Each different color subsystem of the main fluid module comprises an ink supply module 103, an ink return module 104 and an ink level detection module 105 comprised by components enclosed by broken lines in the left subsystem of the FIG. 3 diagram. Thus, the ink supply module 103 comprises an ink pump 111, an ink heater 112, a thermistor and thermostat 113, a three port filter 114 and a check valve 115 arranged in series along an ink supply line 116, which then leads to printhead assembly module 12 via bar temperature sensor 21 which is physically located on nest 13.

The ink return modules (as delineated by dotted enclosure 104 in the left subsystem of FIG. 3) each comprise a three-way solenoid valve 121 having its inlets coupled to the print head outlet line 122 and the catcher return line 123 and its outlet coupled to the foam settling chamber 124, which is also a component of the ink return module 104. The chamber 124 also has an inlet coupled via two-way solenoid 125 to inlet line 126 from the home station 9 of the printer 1. The chamber 124 is coupled by outlet line 128 to the ink reservoir 8 so that defoamed ink can return for recirculation to the print head/nest assembly 12, 13. The ink return module 104 also includes a transducer 127 constructed to sense the ink pressure in line 122 and thereby detect the ink pressure in the print head cavity.

As noted, each of the different color subsystems also includes a level detection module 105 which is constructed to signal when the ink in cartridge 8 reaches a predetermined low level in accord with the teachings of U.S. Pat. No. 4,639,738. This module comprises a pressure differential switch 131 and a sintered flow restrictor/filter element 132. The lines from the level detector module 105 as well as ink supply line 116, filter return line 117, ink return line 128 and vacuum outlet line 141 are all coupled to male valve terminals formed in the top of the ink reservoir housing of the printer. The ink reservoir preferably is constructed as described in U.S. Pat. No. 4,591,875, as a cartridge with check valve elements that cooperate in a mutually opening relation when an ink cartridge top is engaged with the printer terminals.

As shown in FIG. 3, the different color subsystems share the common vacuum module 102. Thus, the outlet line 141 of each subsystem is coupled by a quick-connect fitting 151 of the vacuum module inlet line 152 which in turn empties into ink carry-over container 156 of module 102. As shown, module 102 also comprises a vacuum pump 153 which draws air from lines 141 and ejects it through mist filter 154 to the atmosphere. A detection switch 155 is also provided in module 102 to sense when the container 156 requires emptying, due to condensation and ink carryover. A variable constrictor 157, coupled to the vacuum inlet, allows regulation of the effective vacuum on both ink circulation systems.

The main fluid module 101 is attached with barbed tube connections and three screw-fastenings to the carriage/cross-feed home station assembly of the printer to form a print engine module shown in partially exploded perspective in FIG. 4. Thus, FIG. 4 shows the physical constructions of the modules which comprise the main fluid module 101 as they are connected to frame 200, such frame also being constructed to form a portion of the housing for ink cartridges 8.

More specifically, the two supply modules 103 are constructed to be detachably secured, for removal as an integral unit, by threaded fasteners to portions of frame 200 to the right and left of the ink cartridge positions (as shown by dotted arrows in FIG. 4) The two return modules 104 similarly are constructed to be detachably secured, for removal as an integral unit, to a horizontal portion of frame 200 that extends rearwardly of the cartridge housing and above the location of frame attachment to the cross-feed/home station assembly 9, 6. As shown, the umbilical support 11 supports tubings 210 which lead from modules 103 and 104 to nest 13 on the cross-feed assembly. Umbilical 11 also supports flex-cable 211 which contains circuits leading to terminals 213 of circuit boards 214, which ride on nest 13. As described in more detail in above-referenced U.S. patent application Ser. No. 07/168094, the nest 13 and printhead assembly module 12 are constructed to cooperate in effecting the fluid and electrical connections of tubes 210 and circuits 214 to the appropriate elements of the print head assembly.

As illustrated schematically in FIG. 4, separate level detection modules 105 comprising a pressure differential switch and a sintered flow restrictor are also constructed as integral units, adapted for attachment to frame 200; and a single vacuum module 102 is constructed as an integral unit for attachment at the rear of the printer. The detail construction of the specific modules and the advantages of the approach of the present invention will be further understood by brief reference to FIGS. 5–7.

Figure 5A:
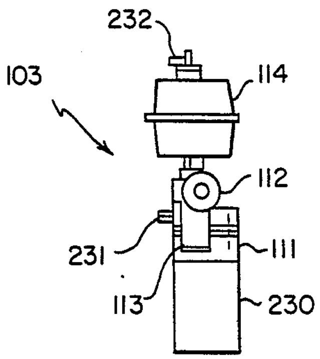
FIGS. 5A and 5B are enlarged front and side views of the FIG. 4 supply module.
Figure 5B:
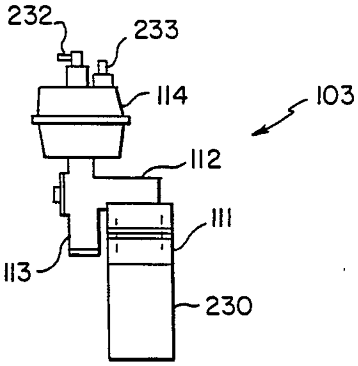

Thus, referring to FIGS. 5-A and 5-B, it can be seen that supply modules 103 each comprise a pump 111 and pump motor 230 coupled in a unitary manner. The supply module inlet 231 is adapted for barb coupling to a tube conduit extending from the ink cartridge housing and the module comprises a passage leading from the pump outlet chamber through heater 112. Thermostat 113 is mounted in a leg of the module extending downwardly from the heater passage. Filter 114 is mounted on the outlet end of the module heating passage and has barbed connector outlets 232, 233 mounted on its upper surface. Thus detachment of the barb connections 231, 232 and 233 allow removal of all the elements comprising the modules 103 simply by loosening the module fastener means.

Figure 6:
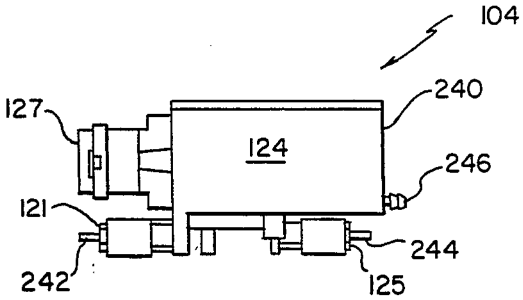
FIG. 6 is an enlarged side view of the FIG. 4 return module.

As shown in FIG. 6, the return modules 104 each comprise a main module housing 240 which has an interior defining a defoam chamber 124. The housing has a barb connection inlet (on a rear portion of the FIG. 6 view) that is coupled to the printhead return line 122. The barb connection 242 is coupled to catcher return line 123. The lines, 122 and 123 are controlled between open and shut conditions by three-way solenoid 121 which is mounted on a portion of housing 240. Pressure transducer 127 is also mounted on housing 240, which has passages formed therein for directing ink from return line 122 into communication with transducer 127. Also mounted on the return module housing is two-way solenoid 125 which controls communication with home station 9 through barb connection inlet 244 on the solenoid 125. The defoam chamber is connectable to the ink cartridge housing by barb connector 246 so that detachment of barb connections 241, 242 and 246 allows removal of the module 104 simply by loosening of its fastener means.

Figure 7:
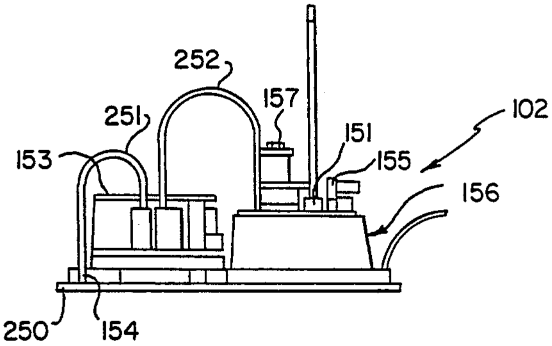
FIG. 7 is an enlarged side view of the FIG. 4 vacuum module.

As shown in FIG. 7, a vacuum module 102 comprises a base plate 250 on which are mounted diaphragm vacuum pump 153, having its outlet coupled to atmosphere via conduit 251 and mist filter 154, and having its inlet coupled to ink collection chamber 156 by conduit 252. Chamber 156 is integral to plate 250 and embodies a float level sensor which actuates detection switch 155. The quick-connect fitting 151 is mounted on the top of chamber 156 so that the module 102 can be easily removed from the printer for the emptying of chamber 156, upon signal from detector 155. Vacuum regulator 157 is also formed on the top of chamber as an integral part of the module 102.

The invention has been described in detail with particular reference to preferred embodiments thereof, but it will be understood that variations and modifications can be effected within the spirit and scope of the invention.

We claim:

1. In continuous ink jet printer apparatus having an ink supply reservoir and a print head for selectively directing print droplets to a print zone, an improved ink circulation system for supplying ink flow from said reservoir to said print head and returning unused ink from said print head to said reservoir, said system comprising:

(a) an ink supply module including ink pump, ink heater and ink filter means that are integrally constructed for removal from said printer as a unit;

(b) an ink return module comprising pressure transducer, ink defoaming and ink flow-control solenoid means that are integrally constructed for removal from said printer as a unit; and (c) a vacuum module including vacuum pump, air vacuum regulator and ink mist collector reservoir means that are integrally constructed for removal from said printer as a unit.

2. In multicolor continuous ink jet printer apparatus, having a plurality of discrete ink reservoirs and a plurality of print head units with inlets and outlets for ink flow, a multicolor ink circulation system comprising:

(a) first and second ink supply modules each including ink pump, ink heater and ink filter means and each being assembled for removal from said printer as a unit;

(b) first and second ink return modules each including ink pressure transducer, ink defoaming and ink flow-control means and each being assembled for removal from said printer as a unit; and (c) a vacuum module, including vacuum pump, vacuum regulator and ink mist collector means, coupled to each of said ink reservoirs and being assembled for removal as a unit from said printer.

3. A continuous ink jet printer having a modular ink circulation and printing system comprising:

(a) an ink reservoir subsystem including a valved ink cartridge and a cartridge housing having ink circulation conduits with cartridge-openable valve terminals;

(b) an ink supply module including ink pump, ink heater and ink filter means which are removable from said printer as a unit;

(c) a printhead assembly module including drop generator, drop charging and drop catching means which are removable from said printer as a unit;

(d) an ink return module comprising ink pressure transducer, ink defoaming and ink flow-control solenoid means which are removable from said printer as a unit; and (e) a vacuum module including vacuum pump, vacuum regulator and ink mist collection reservoir means which are removable from said printer as a unit.

* * * * *